(12) United States Patent  (10) Patent No.: US 8,844,801 B2
Krause                     (45) Date of Patent:      Sep. 30, 2014

(54) IDENTIFICATION AND TRACE OF ITEMS WITHIN AN ASSEMBLY OR MANUFACTURING PROCESS

(75) Inventor: Rainer Klaus Krause, Kostheim (DE)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/280,598

(22) Filed: Oct. 25, 2011

(65) Prior Publication Data

US 2012/0132703 A1     May 31, 2012

(30) Foreign Application Priority Data

Nov. 26, 2010   (EP) .................................. 10192752

(51) Int. Cl.
   G06F 17/00  (2006.01)
   G06Q 10/06  (2012.01)
   G07D 7/20   (2006.01)
   G06Q 10/08  (2012.01)

(52) U.S. Cl.
   CPC .............. G06Q 10/06 (2013.01); G07D 7/20 (2013.01); G06Q 10/0833 (2013.01)
   USPC ............... 235/375; 705/7.11; 705/28; 705/29

(58) Field of Classification Search
   USPC ............................... 235/375; 705/7.11, 28, 29
   See application file for complete search history.

(56) References Cited

U.S. PATENT DOCUMENTS

| 5,537,325 A | 7/1996 | Iwakiri et al. |
| 6,447,370 B1 | 9/2002 | Weldon |
| 2003/0078820 A1* | 4/2003 | Ouchi ................................ 705/7 |
| 2004/0206891 A1* | 10/2004 | Ma et al. ....................... 250/225 |
| 2005/0055119 A1* | 3/2005 | Yen et al. ....................... 700/100 |
| 2006/0277059 A1* | 12/2006 | J'maev et al. ..................... 705/1 |
| 2008/0036602 A1* | 2/2008 | Mullins ....................... 340/572.2 |
| 2008/0277885 A1* | 11/2008 | Duff et al. .......................... 279/3 |
| 2008/0279442 A1 | 11/2008 | Den Boef et al. |
| 2009/0073440 A1 | 3/2009 | Tiemeyer |
| 2010/0023429 A1* | 1/2010 | Bolander et al. ................. 705/28 |
| 2011/0135853 A1* | 6/2011 | Tiller et al. ..................... 428/29 |

\* cited by examiner

*Primary Examiner* — Allyson Trail

(74) *Attorney, Agent, or Firm* — Kunzler Law Group; Steven L. Bennett

(57) ABSTRACT

An apparatus, system, and method are disclosed for identifying and tracing of items within an assembly or manufacturing process. An individual item identifier ("ID") is assigned to an item during one or more of an initial assembly step and a manufacturing step. A surface of the item is read to determine a first surface profile of the item which is associated with the individual item ID. The first surface profile and the individual item ID are stored in a database. The surface of the item is read to determine a second surface profile of the item after each manufacturing or assembling process step in which the surface of the item is manipulated. The second surface profile is compared with the first surface profile and the second surface profile is associated with the individual item ID in response to a mismatch between the first surface profile and the second surface profile.

20 Claims, 3 Drawing Sheets

IDENTIFICATION AND TRACE OF ITEMS WITHIN AN ASSEMBLY OR MANUFACTURING PROCESS

CROSS-REFERENCE TO RELATED APPLICATIONS

This application claims priority to European Patent Office Patent Application Number EP10192752 entitled "METHOD AND A SYSTEM FOR IDENTIFICATION AND TRACE OF ITEMS WITHIN AN ASSEMBLY OR MANUFACTURING PROCESS" and filed on 26 Nov. 2010 for Rainer Klaus Krause, the entire contents of which are incorporated herein by reference for all purposes.

FIELD

The present invention relates to a method and a system for identification and trace of items within an assembly or manufacturing process. In particular, the invention relates to an identification and trace method for the production of semiconductor products, especially solar cell wafers.

BACKGROUND

Today, solar wafers are traced until finishing the solar cell using either a difficult technique to mark the wafer at an edge or applying a so called virtual serialization. In case of virtual serialization, the traceability is often lost after the cell is finished and moved to a module assembly. However, for reason of process control as well as quality control there is a need for a trace of the wafers during the production process as well as after finishing the cell assembly. Such trace would enable to identify e.g. defect cells, trace back the production of such cells up to the very beginning, and to systematically identify sources of errors in the production.

US20090073440 A1 discloses a feature of reading a surface profile (i.e. fingerprint) of a wafer at a spot on the wafer using a contact-free reading technique (e.g. using laser technique). Thereafter, current surface profile is compared with the immediately preceding surface profile. It discloses a method for inspecting a surface of a semiconductor workpiece, the method comprising: providing a surface inspection system and using the surface inspection apparatus to cause laser light to impinge upon a test location on the workpiece surface and thereby cause the laser light to emerge from the surface as returned light comprising at least one of reflected light and scatter light; collecting the returned light and generating a signal from the returned and collected light, the signal comprising a signal value representative of a feature of the workpiece surface at the test location; providing a plurality of threshold candidates and causing the surface inspection system to select a threshold from among the plurality of threshold candidates; comparing the threshold to the signal value to obtain a difference value; using the difference value to assess the feature of the workpiece surface at the test location; and using the surface inspection system to automatically cause the method to be repeated for a plurality of test locations on the workpiece surface.

U.S. Pat. No. 5,537,325 discloses an apparatus and method for the identification of semiconductor wafers in a production process of such. Here, when an ingot is sliced into wafers, they are given serial numbers for identification. This makes possible to identify which any wafer being processed is of those sliced from the ingot no matter where the wafer is in a manufacturing process. Each wafer is traced so as to determine the path along which the wafer was transferred during the manufacturing process, and results are stored as wafer information.

U.S. Pat. No. 6,447,370 B1 discloses a method of presenting a wafer to a metrology device for measuring surface characteristics of the wafer. In accordance with one aspect of the present invention, the metrology device is physically integrated with the wafer processing machine between two wafer processing stations. The metrology device measures the uniformity and or thickness of the wafer. In the preferred embodiment, the measuring device is a single wavelength multi-angle reflectometry device. The device comprises a light source provided from multiple emission points. In the preferred embodiment, the light source comprises a laser and the emission point comprises fiber optic cabling. In accordance with yet another aspect of this patent, a wafer location means is provided to track the position of the wafer passing over the wafer measurement device. Preferably, the tracking device comprises a light curtain comprising a light beam which detects when the wafer is entering the measuring device and suitably enables the tracking of the location of the wafer.

US 2008/0279442 discloses an inspection apparatus configured to measure a property of a substrate. The inspection apparatus includes a first radiation source configured to irradiate a measurement spot on a patterned target of a substrate; a second radiation source configured to irradiate an area of the patterned target that is larger than the measurement spot; a first detector configured to detect radiation having been diffracted from the measurement spot and radiation having been reflected from the area of the patterned target, and to output an image of the relative positions of the measurement spot and the area of the patterned target; an image processor configured to receive the output of the first detector, to compare the position of the measurement spot with respect to the area of the patterned target, and to output a value of the position of the measurement spot relative to the area of the patterned target; a second detector configured to detect radiation from the first radiation source having been diffracted from the measurement spot, and to output a diffraction spectrum corresponding to the patterned target; and a processor configured to process the output of the image processor and the output of the second detector to reconstruct the pattern of the patterned target within the measurement spot.

BRIEF SUMMARY

It is therefore an object of the invention to provide method for the identification and trace of items within an assembly or manufacturing process. This object is achieved by the independent claims. Advantageous embodiments are detailed in the dependent claims.

In another aspect it is an object of the invention to provide a system for the identification and trace of items within an assembly or manufacturing process.

Accordingly, with respect to the method, the object is achieved by a method for the identification and trace of items within an assembly or manufacturing process, the method comprising the steps of:

assigning an individual item ID to each item during an initial assembly or manufacturing step;

reading a first surface profile of each item using a contactless process;

aligning the individual item ID to the read first surface profile;

storing the aligned surface profile and item ID in a database;

reading a second surface profile of each item after each manufacturing process step or assembling process step in which the surface is manipulated;

comparing the second surface profile with the first surface profile; and aligning the second surface profile to the individual item ID when there is a mismatch between the first surface profile and the second surface profile.

The invention deals with the fact, that an item, like e.g. a wafer, must be traced during process. At several process steps the surface is changed due to the process itself, like during texturing where an etching step is applied to form a surface profile. Also, during oxide etching the surface is changed, as well as at passivation due to optical change. The initial scan at for example a virgin wafer must be linked to the various other measurements to achieve consistent traceable information.

The individual item ID to be assigned to each item may be any kind of alphanumerical index, preferably a virtual alphanumerical index. The term virtual in this concern should be understood as that no mechanical marking of the item is used, but only a alphanumerical index in a computer system is assigned to the item.

In case of e.g. semiconductor or solar wafer production, the initial assembly or manufacturing step of the item may be, e.g. the cutting of a crystal into wafer-slices or the feeding of these wafer-slices into a production-line for further processing of the wafer.

In a preferred embodiment of the invention, contactless reading of a surface profile of each item is generated by a laser surface scan of at least one area of the surface of each item. For doing so, laser light is caused to impinge upon a surface area of an item and thereby cause the laser light to emerge from the surface area as returned light comprising at least one of reflected light and scatter light. The returned light is collected by, e.g. a photodiode, CCD-sensor or the like, which generates a signal from the returned and collected light. The signal represents a fingerprint of the scanned surface area of the item.

Since during assembly or manufacturing of an item, the surface characteristics may be changed, like e.g. by etching or texturing the surface, or deposition of a surface layer, the scan of the surface area has to be reiterated after each manufacturing or assembling step in which the surface characteristic is changed. By comparison of the surface scans prior and after a manufacturing or assembling step in which the surface is manipulated, it can be determined whether the surface characteristic (i.e. the fingerprint of the item) has change. If the surface characteristic has changed, the fingerprint which was detected after the surface manipulating manufacturing or assembling step is aligned to the individual item ID. By doing so, each individual item can be identified at any time during the manufacturing or assembling, as well as after the manufacturing or assembling has been finished. This enables traceability of each item of the whole item lifetime circle.

In a preferred embodiment of the invention, the surface profile is read at a predefined surface spot of the item. Preferably, such a predefined spot is located about the middle of the item. The surface spot may be defined by its distance to the margin (edges and/or corners) of the item. The determination of the spot within the item surface may be performed e.g. by time-aligning the movement of a scanner apparatus of the surface of the item. Time-aligning in this concern should be understood as that the scanner apparatus moves relative to the surface of the item from the margin of the item for a defined time. The margin of the item may thereby be detected by use of an appropriate sensor, like e.g. a sensor barrier or use of a CCD-camera sensor in combination with an image recognition software. When the margin of an item is detected, the scanner apparatus is moved relative to the surface of the item for a period of time in which, under consideration of the relative velocity of the movement, the middle of the item surface is approached. An alternative method to determine the middle of the item surface is the use of a CCD-camera sensor in combination with an image recognition software. Here, the middle of the item surface is calculated from the image data gathered from the CCD-camera sensor and the scanner apparatus is moved toward the middle of the item surface until the approach of the middle is detected by the CCD-camera sensor.

In a further embodiment of the inventive method, the item ID and the surface profiles aligned to the item ID are stored in a database of a manufacturing execution system. Such a manufacturing execution system may be e.g. manufacturing control database.

In a further embodiment, the first surface profile is substituted by the second surface profile in case of a mismatch between the first and the second surface profile. This enables to reduce the amount of data related to each item which is to be stored in a database. This makes the method more lean and enables a fast identification of an item by means of the surface fingerprint. Additional surface reading can be applied before surface impacting process step to secure accurate rotational positioning of the wafer.

In another embodiment of the invention, additional data relating to the item are aligned with the item ID, like e.g. processing parameters used in specific manufacturing steps, batch numbers, operator identifications, or the like. By this, a whole history of an item can be recalled by means of the surface profile (fingerprint) as identification.

With respect to the system, the object is achieved by a system for the identification and trace of items within an assembly or manufacturing process, the system comprising:

a conveying means for conveying an item to be manufactured or assembled alongside a production line;

a means for reading a first surface profile of the item;

a means for reading a second surface profile of the item; and a controller comprising a database system, wherein the means for reading a first surface profile of the item is located at the very beginning of the production line and adapted to provide an initial surface profile of the item, and the wherein the means for reading a second surface profile of the item is located subsequent to a production step in which the surface of the item is manipulated, wherein the means for reading the surface profile are connected to the controller, and wherein the database is capable to align the first and the second surface profile with an individual virtual ID of each item.

In an embodiment of the invention, the conveying means for conveying the item is a conveying belt, a conveying disk, a manipulator, or the like.

In a further embodiment of the invention, the means for reading the first and the second surface profile are laser scanner. In a preferred embodiment, the first and the second surface profile is gathered by the same laser scanner.

In another embodiment of the inventive system, the controller is a computer system comprising appropriate input and output means to receive data from the surface profile reading means and to control the conveying means and the surface profile reading means. Preferably, the surface profile reading means and the conveying means are connected to the controller by use of an appropriate network-system, like e.g. Ethernet, TCP/IP, or the like.

In a further embodiment of the invention, the system comprises a sensor for the determination of the margin of the item, which sensor is connected to the controller, too. Such sensor may be a barrier sensor or a CCD-camera sensor in combination with an image recognition software. This enables contactless determination of the margin of an item, thereby avoiding the risk of mechanical damaging the item. Furthermore, the system may comprise a sensor for the determination of the velocity of the conveying means, i.e. for the determination of the speed at which an item is conveyed along a manufacturing or assembling production line. Also this sensor may be connected to the controller.

In a further embodiment, the system may comprise a means to manipulate the relative position of the item with respect to the surface profile reading means. This enables to position the item in an appropriate way to ensure the gathering of the surface profile at the same spots of the item surface.

In another embodiment of the invention, the system comprises a means which is capable to compare the surface profile read by the first surface profile reading means and the surface profile read by the second surface profile reading means, and to align the second surface profile to the individual ID in case of a mismatch of the first and the second surface profile. Such a means may be an image recognition software which is executed on the controller.

The object of the invention is furthermore achieved by a computer program product stored on a computer usable medium, comprising computer readable program means for causing a computer to perform a method as described in the above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

Preferred embodiments of the invention are illustrated in the accompanied figures. These embodiments are merely exemplary, i.e. they are not intended to limit the content and scope of the appended claims.

DETAILED DESCRIPTION OF THE INVENTION

Figure 1:
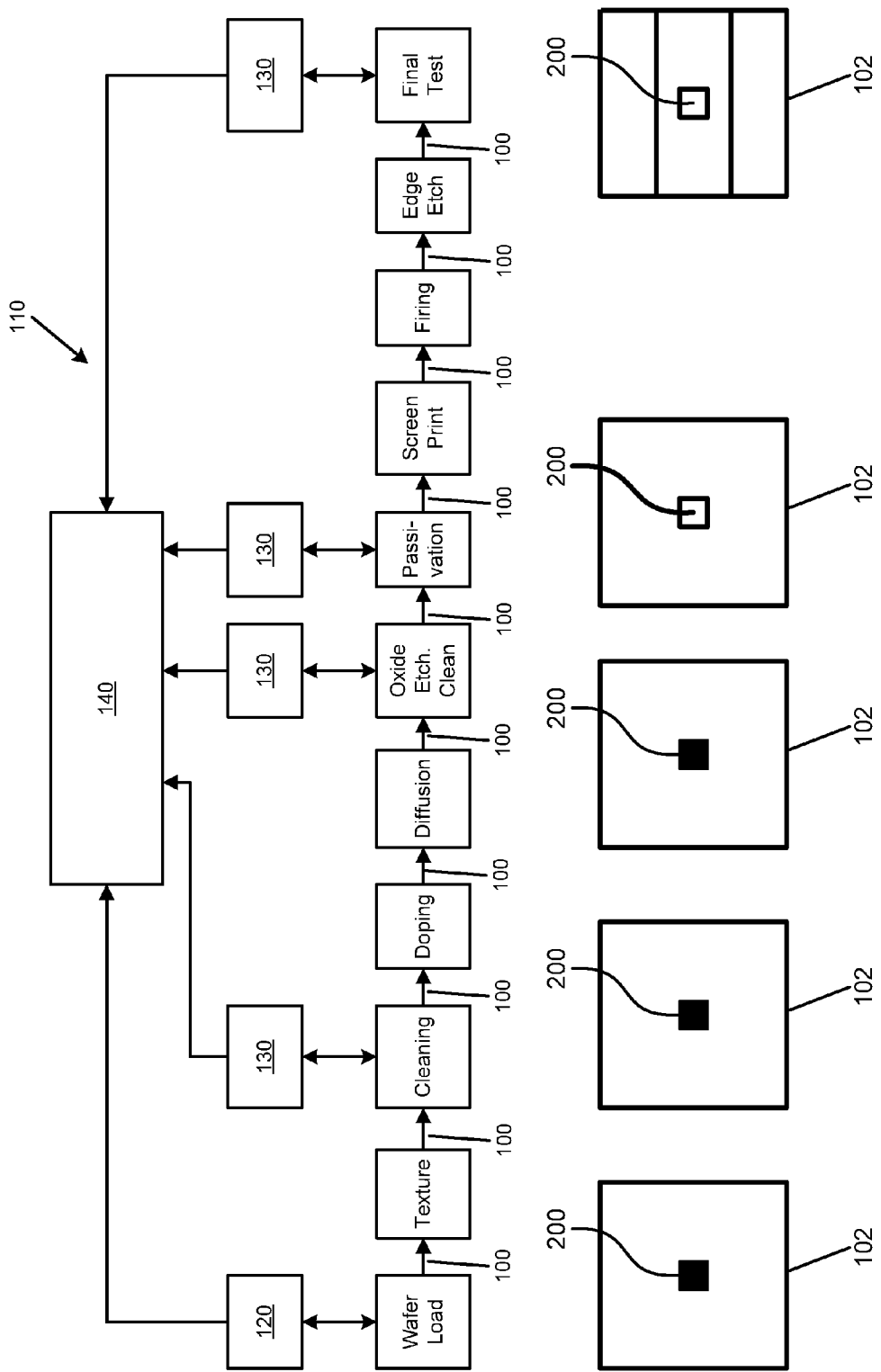
FIG. 1 schematically shows the implementation of one embodiment of the inventive method and system in a production line of photovoltaic cells.

Referring now to FIG. 1, in a production line 110 for the production of solar wafer cells 102 for photovoltaic applications, a center spot 200 of a solar wafer 102 is subject to an initial surface profile scan by a first means 120 for reading a first surface profile. In this embodiment, the first means 120 is a laser surface scanner. The solar wafer 102 is loaded onto a conveying means 100 of the production line 110 by which the solar wafer 102 is conveyed through the production line form one treatment step to the other. After texturing and cleaning, the center spot 200 of the item 102 is scanned by means 130 for reading a second surface profile of the item, which means 130 is a laser surface scanner, too. After the subsequent treatment steps of doping, diffusion, and oxide etching/cleaning, the center spot 200 is scanned again to provide a third surface profile of the item 102. The same is done after the passivation step. Then, after a screen printing, firing, edge etching, and a final test of the solar wafer 102, a final surface profile is read. The means 120, 130 for reading the surface profile are connected to a controller 140, e.g. a computer system. The controller 140 provides a unique virtual ID for each solar wafer 102, which ID is stored in a database executed on the controller 140. Additional to the ID, the surface profile read by the surface profile reading means 120, 130 are stored in the database. By the inventive method, at any during the production process an item can be identified on basis of its surface profile and comparison of the surface profile with the surface profiles stored in the database system.

Figure 2:
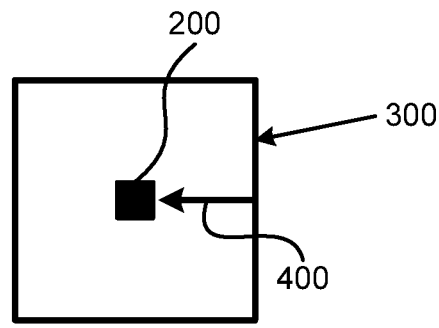
FIG. 2 schematically shows one embodiment of how to detect a spot for a surface profile scan within a surface of an item.

FIG. 2 schematically shows a solar wafer surface with a center spot 200. In a first step the solar wafer edge 300 is detected by using a video image feature. The laser head of a surface profile reading means is aligned to the centre line of the solar wafer. In a second step the center spot of the solar wafer is identified by using the speed of the relative movement of the solar wafer to the surface reading means. Since the size of the wafer in general is known as a process parameter, the center spot region is approached when a time has passed that equals a relative movement 400 of 50% of the overall length of the solar wafer in direction of the relative movement. By this method, the center spot can be approached with very high accuracy.

Figure 3:
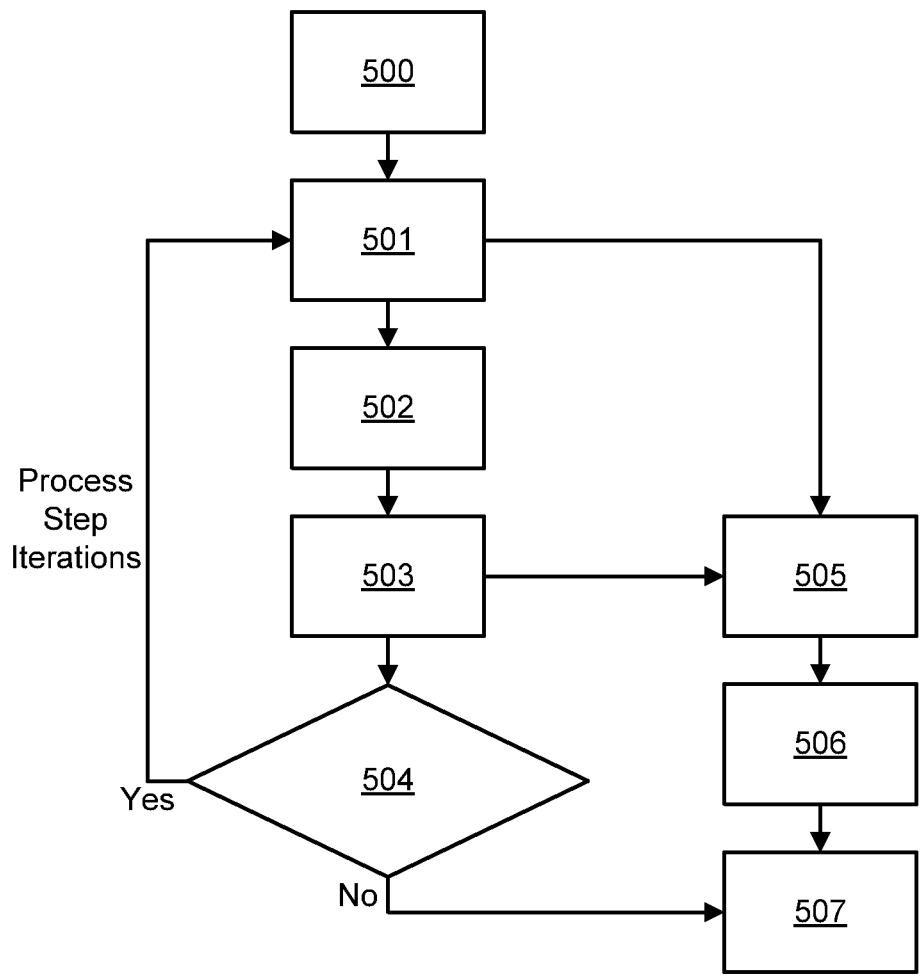
FIG. 3 shows in a basic flow chart one embodiment of the inventive method for identification and trace of items within an assembly or manufacturing process.

FIG. 3 shows in a basic flow chart the inventive method for identification and trace of items within an assembly or manufacturing process. In a first step 500 a unique wafer ID is initiated for each wafer. The conveying means position, the conveying speed as well as the wafer orientation are considered for generation a time stamp information for each wafer. In a second step 501, available wafer based information are determined and aligned to the wafer ID. In step 502, the wafer edge is detected and a center spot of the wafer is approached by a surface profile reading means as described under FIG. 2. In step 503, the surface profile reading is performed. The read surface profile is aligned with the ID and the other wafer information in step 505. These data are uploaded in step 506 into a database system. In 504, if further manufacturing steps are to follow, the process is iterated at step 501. Otherwise, a final data upload into the database is performed in step 507.

Figure 4:
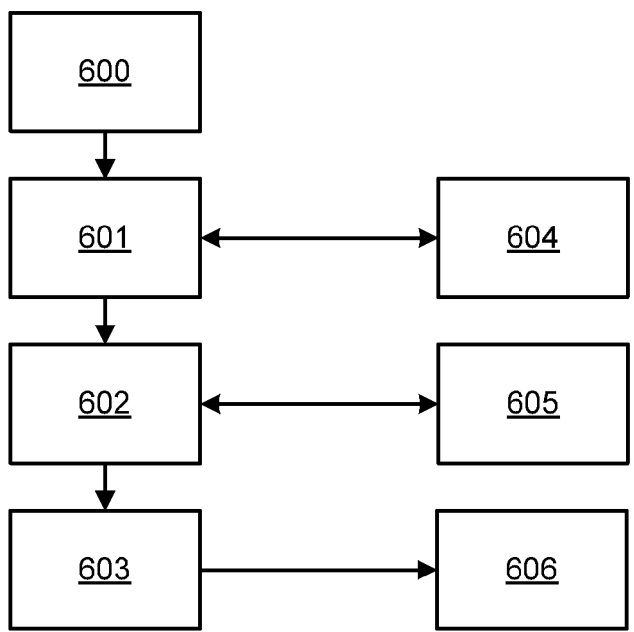
FIG. 4 shows in a basic flow chart an extract of one embodiment of the inventive method for identification and trace of items within an assembly or manufacturing process.

FIG. 4 depicts an extract of the inventive method for identification and trace of items within an assembly or manufacturing process. In step 600 the solar wafer edge is detected. In step 601 the available information about a wafer, like e.g. time stamp, wafer frequency, conveying speed, etc., are retrieved from the database 604. This can be done for example by use of a manufacturing execution system. In step 602 the actual surface profile read is aligned to the information already retrieved from the database and restored in 605. At the end of the production, all data, like e.g. the ID, the process parameters, the time stamp etc., are combined in step 603 and stored in 606. This enables the identification of each solar wafer as after finalization of the production.

Figure 5:
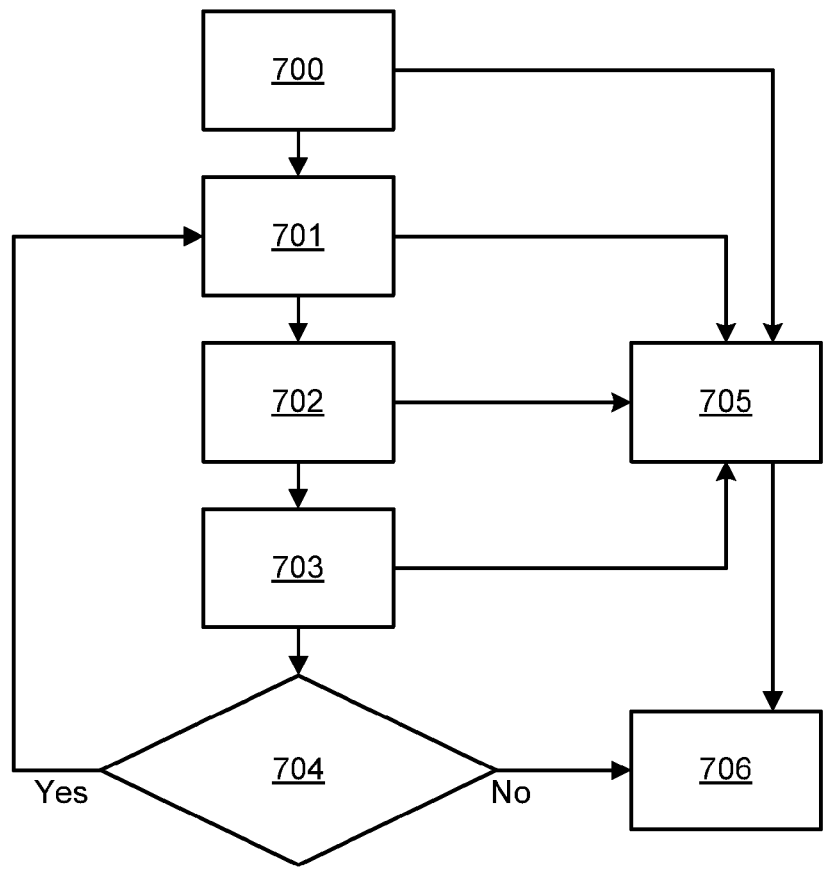
FIG. 5 shows in a basic flow chart one embodiment of an algorithm according to the inventive method.

FIG. 5 shows in a basic flow chart an algorithm according to the inventive method. In step 700 a initial surface profile is read at the load of the solar wafer onto the production line. In 701 the wafers within the production line are counted by detection of the edges of each wafer. In 702 a time stamp is aligned to each wafer and the time of the wafer within the production line is calculated. In 703 the spot of the wafer at which the surface profile is to be read is approached and the surface profile reading is performed. The data coming from steps 701, 702, and 703 are linked with various other data about the solar wafer in step 705. If the production process is not finalized in 704, the steps starting at 701 are iterated after each production process step manipulating the surface of the solar wafer until the production process is finalized. After finalization the consistency and the completeness of the data are checked in step 706.

Table 1 exemplarily shows a run time table for a solar wafer propagation through a manufacturing line.

TABLE 1

| Second Scan | | Third Scan | | Fourth Scan | | Fifth Scan | |
| --- | --- | --- | --- | --- | --- | --- | --- |
| 10 m run time plus process time | 100 sec | 30 m run time plus process time | 200 sec | 40 m run time plus process time | 100 sec | 80 m run time plus process time | 400 sec |
| Texturing | 30 sec | Doping | 60 sec | Load into | 120 sec | Screen Print | 900 sec |
| Cleaning | 30 sec | Diffusion | 1200 sec | Passivation | 1200 sec | Paste drying | 600 sec |
| Total | 160 sec | Oxide etch | 60 sec | Unload carrier | 120 sec | Screen print (front side) | 1200 sec |
| | 2.6666667 min | Cleaning | 30 sec | Total | 3250 sec | | |
| | | Total | 1710 sec | | 54.17 min | Past drying | 600 sec |

TABLE 1-continued

| Second Scan | Third Scan | Fourth Scan | Fifth Scan | |
|---|---|---|---|---|
| | 28.50 min | | Firing | 1200 sec |
| | | | Edge etch | 300 sec |
| | | | Test | 300 sec |
| | | | Total | 8750 sec |
| | | | | 145.83 min |

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A method for identifying and tracing of items within an assembly or manufacturing process, the method comprising:
assigning an individual item identifier ("ID") to an item during one or more of an initial assembly step and a manufacturing step;
scanning a surface of the item to determine a first surface profile of the item using a contactless process, wherein the first surface profile of the item is unique and identifies the item where the first surface profile of the item differs from a surface profile of other items;
associating the individual item ID with the read first surface profile;
storing the first surface profile and the individual item ID in a database;
scanning the surface of the item to determine a second surface profile of the item after each manufacturing process step or assembling process step in which the surface of the item is manipulated, wherein the surface scanned to determine the first surface profile is the same surface scanned to determine the second surface profile and wherein the second surface profile of the item is unique and identifies the item where the second surface profile of the item differs from a surface profile of other items;
comparing the second surface profile with the first surface profile; and
associating the second surface profile to the individual item ID in response to a mismatch between the first surface profile and the second surface profile.

2. The method of claim 1, wherein the first surface profile and the second surface profile are read at a predefined surface spot of the item.

3. The method of claim 2, wherein the surface spot is defined by a distance to one or more of the edges and the corners of the item.

4. The method of claim 1, wherein the individual item ID and the first and second surface profiles associated with the individual item ID are stored in a database of a manufacturing execution system.

5. The method of claim 1, wherein the surface profile is generated by a laser surface scan.

6. The method of claim 1, wherein the first surface profile is substituted by the second surface profile in case of a mismatch between the first and second surface profile.

7. The method of claim 1, wherein additional data relating to the item are associated with the item ID.

8. The method of claim 1, wherein the individual item ID is a virtual alphanumerical ID.

9. A system for the identification and trace of an item within one or more of an assembly and a manufacturing process, the system comprising:
a conveying means for conveying an item to be manufactured or assembled along a production line;
a first means for scanning a surface of the item to determine a first surface profile of the item, wherein the first surface profile of the item is unique and identifies the item where the first surface profile of the item differs from a surface profile of other items;
a second means for scanning a surface of the item to determine a second surface profile of the item, wherein the surface scanned to determine the first surface profile is the same surface scanned to determine the second surface profile and wherein the second surface profile of the item is unique and identifies the item where the second surface profile of the item differs from a surface profile of other items; and
a controller comprising a database system,
wherein the first means for scanning the surface of the item is located at a beginning of the production line, and wherein the second means for scanning the surface of the item is located subsequent to a production step in which the surface of the item is manipulated, wherein the first and second means for scanning the surface of the item are connected to the controller, and wherein the database is capable to associate the first surface profile and the second surface profile with an individual virtual ID of the item.

10. The system of claim 9, further comprising a sensor for determining a margin of the item, wherein the sensor is connected to the controller.

11. The system of claim 9, further comprising a sensor for determining a speed at which the conveying system conveys the item along the production line.

12. The system of claim 9, further comprising means to manipulate a relative position of the item with respect to the first, second, or first and second means for scanning the surface of the item.

13. The system of claim 9, further comprising means to assure that the first and second means for scanning the surface of the item scan an identical area of the item.

14. The system of claim 9, further comprising a means capable to compare the first surface profile and the second and to associate the second surface profile to the individual ID in case of a mismatch of the first surface profile and the second surface profile.

15. A computer program product for identifying and tracing of items within an assembly or manufacturing process, the computer program product comprising a non-transitory computer readable storage medium having computer readable program code embodied therewith, the computer readable program code comprising:

assigning an individual item identifier ("ID") to an item during one or more of an initial assembly step and a manufacturing step;

scanning a surface of the item to determine a first surface profile of the item using a contactless process, wherein the first surface profile of the item is unique and identifies the item where the first surface profile of the item differs from a surface profile of other items;

associating the individual item ID with the read first surface profile;

storing the first surface profile and the individual item ID in a database;

scanning the surface of the item using a contactless process to determine a second surface profile of the item after each manufacturing process step or assembling process step in which the surface of the item is manipulated, wherein the surface scanned to determine the first surface profile is the same surface scanned to determine the second surface profile and wherein the second surface profile of the item is unique and identifies the item where the second surface profile of the item differs from a surface profile of other items;

comparing the second surface profile with the first surface profile; and associating the second surface profile to the individual item ID in response to a mismatch between the first surface profile and the second surface profile.

16. The computer program product of claim 15, wherein the first surface profile and the second surface profile are scanned at a predefined surface spot of the item.

17. The computer program product of claim 15, further comprising storing the individual ID and the first and second surface profiles associated with the individual ID in a database.

18. The computer program product of claim 15, wherein the first and second surface profiles are generated by a laser surface scan.

19. The computer program product of claim 15, further comprising substituting the second surface profile for the first surface profile in response to a mismatch between the first profile and the second surface profile.

20. The computer program product of claim 15, further comprising relating additional data with the individual item ID, the additional data relating to one or more of the item, the assembly process and the manufacturing process.

* * * * *